United States Patent
Niimi et al.

(10) Patent No.: US 6,544,443 B2
(45) Date of Patent: Apr. 8, 2003

(54) SEMICONDUCTING CERAMIC MATERIAL AND ELECTRONIC PART EMPLOYING THE SAME

(75) Inventors: Hideaki Niimi, Hikone (JP); Akira Ando, Omihachiman (JP); Mitsutoshi Kawamoto, Hirakata (JP); Masahiro Kodama, Shiga-ken (JP)

(73) Assignee: Murata Manufacturing Co., Ltd. (JP)

( * ) Notice: Subject to any disclaimer, the term of this patent is extended or adjusted under 35 U.S.C. 154(b) by 165 days.

(21) Appl. No.: 09/730,133

(22) Filed: Dec. 5, 2000

(65) Prior Publication Data

US 2001/0003361 A1 Jun. 14, 2001

(30) Foreign Application Priority Data

Dec. 9, 1999 (JP) .......................... 11-350306

(51) Int. Cl.[7] .............................. H01B 1/08; H01C 7/02; H01C 7/04
(52) U.S. Cl. ............................. 252/518.1; 252/521.1; 252/521.3; 501/123; 501/133; 338/225 D
(58) Field of Search ................. 252/518.1, 521.3, 252/521.1; 501/123, 133; 428/688, 901; 338/225 D

(56) References Cited

U.S. PATENT DOCUMENTS

| | | | |
|---|---|---|---|
| 4,022,716 A | 5/1977 | Ueoka et al. | 252/520 |
| 5,084,426 A | * 1/1992 | Iwaya et al. | 501/135 |
| 5,424,707 A | * 6/1995 | Ishikawa et al. | 338/22 SD |
| 5,858,533 A | * 1/1999 | Greuter et al. | 428/404 |

FOREIGN PATENT DOCUMENTS

| | | |
|---|---|---|
| EP | 0256405 | 2/1998 |
| EP | 0257653 | 3/1998 |
| EP | 0974982 | 1/2000 |
| KR | 1999-83131 | 11/1999 |
| KR | 2000-57151 | 9/2000 |

OTHER PUBLICATIONS

Korean Examination Report dated Jul. 25, 2002, along with an English translation.

* cited by examiner

Primary Examiner—Mark Kopec
(74) Attorney, Agent, or Firm—Ostrolenk, Faber, Gerb & Soffen, LLP

(57) ABSTRACT

The semiconducting ceramic material of the present invention containing $BaTiO_3$ and having a positive temperature coefficient of resistance is endowed with high withstand voltage. In the semiconducting ceramic material, a boundary temperature defined at the boundary between a first temperature range and a second temperature range is 180° C. or more (e.g., 370° C.) higher than the Curie temperature, wherein the first temperature range is higher than the Curie temperature and the ceramic material has a positive temperature coefficient of resistance in the range, and the second temperature range is higher than the first temperature range and the ceramic material has a negative temperature coefficient of resistance in the range.

9 Claims, 3 Drawing Sheets

SEMICONDUCTING CERAMIC MATERIAL AND ELECTRONIC PART EMPLOYING THE SAME

BACKGROUND OF THE INVENTION

1. Field of the Invention

The present invention relates to a semiconducting ceramic material and to an electronic part employing the same. More particularly, the invention relates to a $BaTiO_3$ semiconducting ceramic material possessing a positive temperature coefficient of resistance and to an electronic part, such as a thermistor, employing the ceramic material.

2. Background Art

Conventionally, $BaTiO_3$ semiconducting ceramic materials, which have a positive temperature coefficient (abbreviated as PTC) of resistance (such characteristic is referred to as a PTC characteristic), have been employed in PTC thermistors used in a wide range of applications; e.g., for demagnetization of a cathode ray tube or as an element in heaters. Furthermore, there has been a strong demand for elevating the withstand voltage of $BaTiO_3$ semiconducting ceramic material in order to broaden its area of use, and addition of elements such as Mn and Ca to the ceramic material has been proposed.

However, sufficient withstand voltage in $BaTiO_3$ semiconducting ceramic materials which have existing compositional proportions and which are produced through an existing method is difficult to realize, and the thickness of semiconducting ceramic sheets must be increased so as to attain the desired high withstand voltage. However, when a semiconducting ceramic sheet is incorporated into an electronic part such as a monolithic PTC thermistor, the thickness of the ceramic sheet cannot be increased beyond a certain level. Therefore, there has been a strong demand for elevating withstand voltage per unit thickness of a semiconducting ceramic material.

SUMMARY OF THE INVENTION

In view of the foregoing, the present inventors have conducted extensive studies on semiconducting $BaTiO_3$ ceramic materials having a PTC characteristic (hereinafter referred to as "PTC semiconducting $BaTiO_3$ ceramic materials") in terms of the relationship between withstand voltage and the temperature characteristic of resistance, and have found that controlling the temperature (hereinafter referred to as "TN temperature," see FIG. 1) defined at the boundary between a first temperature range and a second temperature range to 180° C. or more higher than the Curie temperature results in a withstand voltage remarkably higher than that of an existing similar semiconducting ceramic material, even though the resistance at room temperature is the same in both cases. The first temperature range is higher than the Curie temperature and the ceramic material has a positive temperature coefficient of resistance in this range, and the second temperature range is higher than the first temperature range and the ceramic material has a negative temperature coefficient of resistance.

PTC semiconducting $BaTiO_3$ ceramic materials produced through a conventional method exhibit a difference between TN temperature and Curie temperature of 100-150° C. The present inventors have elucidated that suppression of a liquid phase component to a minimum level and control of the firing temperature to a temperature at which ceramic is not completely sintered are effective measures for elevating the TN temperature and result in a remarkably high withstand voltage. The present invention has been accomplished on the basis of these findings. The expression "not completely sintered" refers to a state in which sintered ceramic grains are present in association with a volume of intergranular space. In contrast, the expression "completely sintered" refers to a state in which sintered ceramic grains are highly densified such that substantially no intergranular space can be observed under a typical electron microscope.

Thus, an object of the present invention is to provide a PTC semiconducting $BaTiO_3$ ceramic material having a high withstand voltage. Another object of the present invention is to provide a method of producing the semiconducting ceramic material. Yet another object of the present invention is to provide an electronic part employing the semiconducting ceramic material.

Accordingly, in one aspect of the invention, there is provided a semiconducting ceramic material comprising $BaTiO_3$ and exhibiting a PTC characteristic, wherein the boundary temperature defined at the boundary between a first temperature range and a second temperature range is 180° C. or more higher than Curie temperature, wherein the first temperature range is higher than Curie temperature and the ceramic material has a positive temperature coefficient of resistance in the range, and the second temperature range is higher than the first temperature range and the ceramic material has a negative temperature coefficient of resistance within this range.

Preferably, a portion of Ba atoms are substituted by Sm atoms, $SiO_2$ is contained at a mol ratio represented by $r_1$ of approximately 0.0005 and Mn is optionally contained at a mol ratio represented by $r_2$ of 0 to approximately 0.0001, inclusive, the mol ratios being based on $BaTiO_3$ serving as a predominant component.

In the present invention, the Curie temperature is an equivalent of crystal phase transition temperature in the transition from tetragonal to cubic or from cubic to tetragonal.

In another aspect of the invention, there is provided an electronic part comprising internal electrodes and a semiconducting ceramic material as recited above, the internal electrodes and the semiconducting ceramic material being alternately superposed one on another.

In yet another aspect of the invention, there is provided a method of producing a semiconducting ceramic material, comprising mixing a $BaTiO_3$ source, a material imparting a semiconducting property to $BaTiO_3$, $SiO_2$, and optionally Mn, to thereby form a mixture;

calcining the resultant mixture;

mixing the resultant calcined mixture with an organic binder;

compacting the resultant mixture, to thereby yield a compact;

firing the compact in an $H_2/N_2$ atmosphere at a temperature lower than a temperature at which the mixture is completely sintered; and performing re-oxidation of the fired compact in air.

Preferably, the re-oxidization is carried out at approximately 1000° C.

Preferably, the firing temperature is approximately 1225-1275° C.

Although the temperature at which a ceramic material is completely sintered depends on the chemical composition thereof, a semiconducting ceramic material according to the present invention is completely sintered at 1350° C.

As is the case conventionally, when the difference between the TN temperature and Curie temperature is 180° C. or less, sufficient withstand voltage cannot be attained.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with accompanying drawings, in which.

DETAILED DESCRIPTION OF PREFERRED EMBODIMENTS

EXAMPLE 1

$BaCO_3$, $TiO_2$, $Sm_2O_3$, $MnCO_3$ and $SiO_2$ serving as raw materials were blended to prepare mixtures such that the following compositional proportions were attained:

$(Ba_{0.998}Sm_{0.002})_{1.002}TiO_3 + X \cdot Mn + Y \cdot SiO_2$.

Each of the resultant powder mixtures was ground by mixing in water with zirconia balls for five hours, followed by calcination at 1100° C. for two hours. The calcined product was mixed with an organic binder, and the resultant mixture was compacted under dry conditions. The resultant compact was fired at a predetermined temperature in an $H_2/N_2$ atmosphere, and then re-oxidized at 1000° C. in air, to thereby yield a ceramic specimen. The firing temperature was modified in accordance with the specimen to be prepared. Four kinds of specimens were obtained. A specimen of Comparative Example 1 was obtained through a conventional method in which the PTC characteristic was controlled on the basis of the amount X of Mn that had been added and the amount Y of $SiO_2$ that had been added. Specimens of Examples 1 to 3 were obtained through a method according to the invention in which the amounts of Mn and $SiO_2$ were limited to minimum levels and firing was performed at a relatively low temperature.

Figure 1:
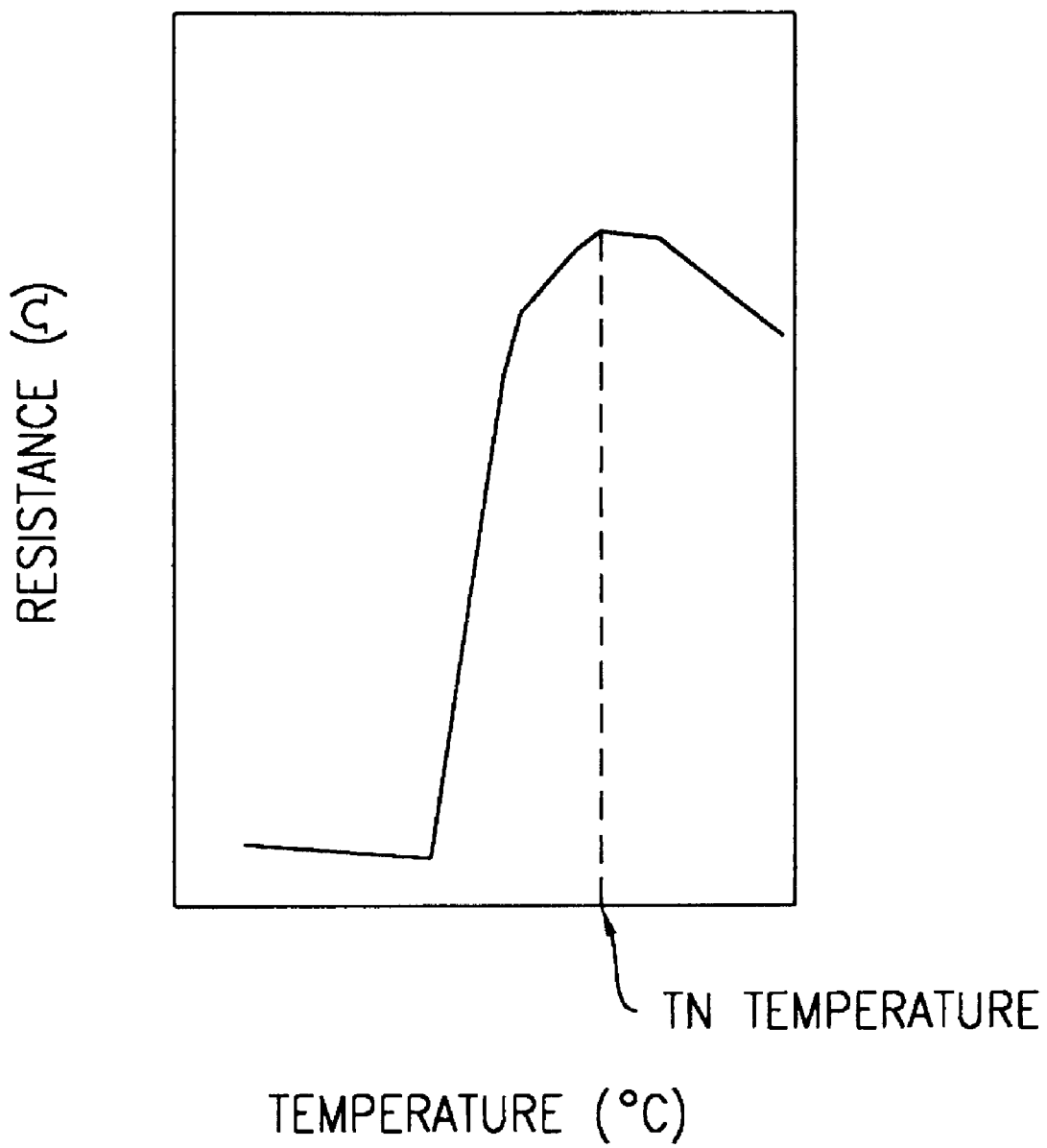
FIG. 1 is a graph showing a resistance-temperature characteristic of a PTC semiconducting $BaTiO_3$ ceramic material.
Figure 2:
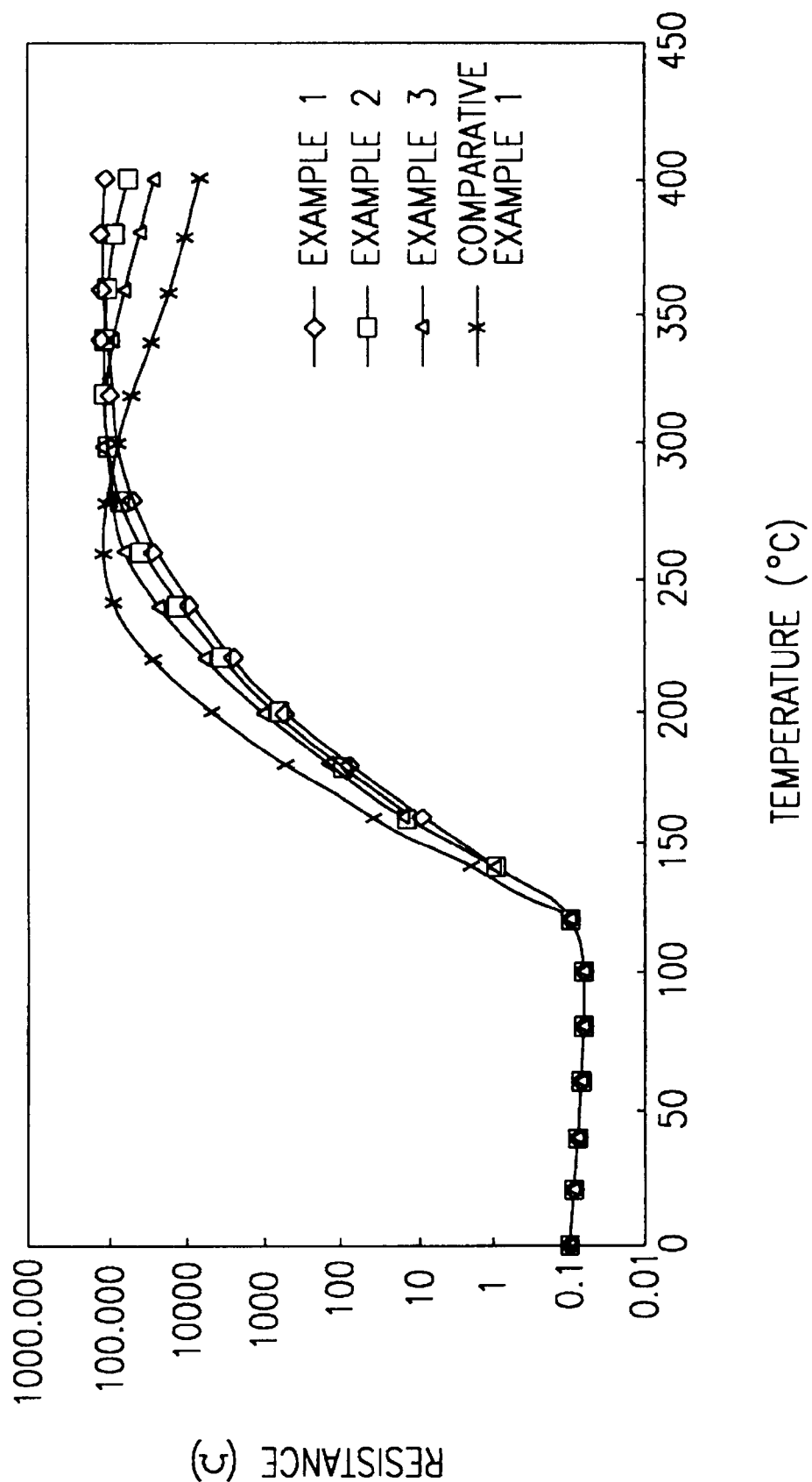
FIG. 2 is a graph showing resistance-temperature characteristics of ceramic material samples of Examples 1 to 3 and Comparative Example 1.

Table 1 shows properties of the specimens in terms of the amount (X) of Mn added, the amount (Y) of $SiO_2$ added, firing temperature, TN temperature, the difference between TN temperature and Curie temperature, resistance at room temperature, the PTC characteristic (the ratio of maximum resistance ($R_{max}$) in the temperature range from 0° C. to 400° C. to resistance ($R_{25}$) at 25° C., the ratio being rounded to the nearest integer and expressed as the number of digits in the integer), and withstand voltage. FIG. 2 shows the resistance-temperature characteristics of the specimens.

mum levels and firing at low temperature, although the specimens have resistance at room temperature and PTC characteristics similar to those of the specimen of Comparative Example 1.

EXAMPLE 2

$BaCO_3$, $TiO_2$, $Sm_2O_3$, $MnCO_3$ and $SiO_2$ serving as raw materials were blended to prepare mixtures such that the following compositional proportions were attained:

$(Ba_{0.998}Sm_{0.002})_{1.002}TiO_3 + X \cdot Mn + Y \cdot SiO_2$.

Figure 3:
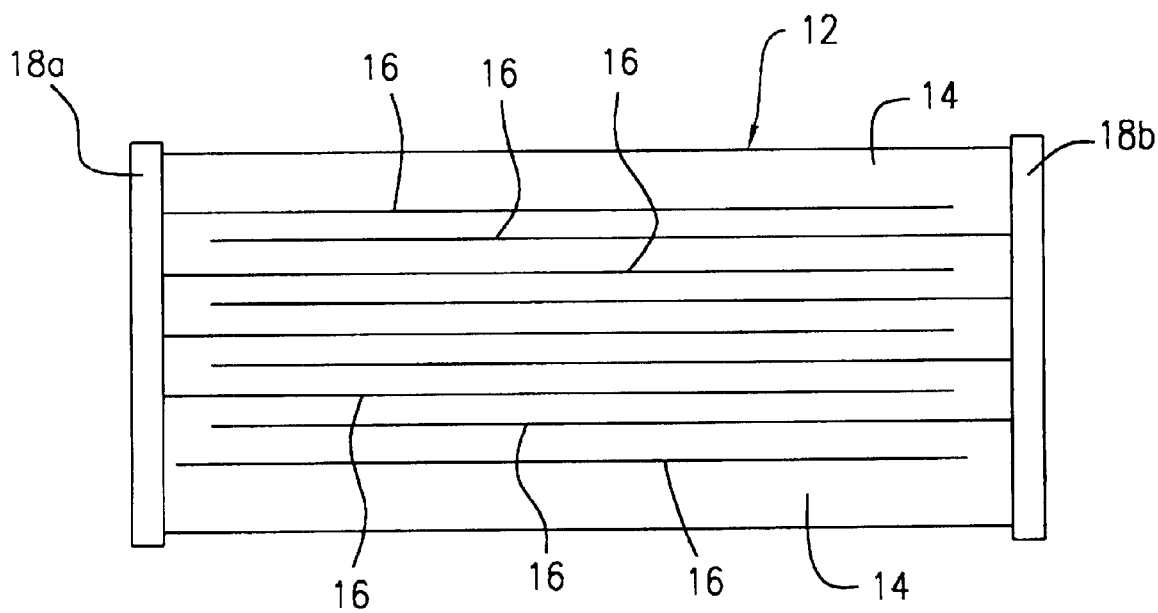
FIG. 3 is an schematic view of one example of a monolithic PTC thermistor.

Each of the resultant powder mixtures was ground by mixing in water with zirconia balls for five hours, followed by calcination at 1100° C. for two hours. The calcined product was mixed with an organic binder and formed into sheets. Ni serving as an internal electrode was printed on each sheet. A plurality of the Ni-coated sheets were laminated, and the resultant laminate was fired in an $H_2/N_2$ reducing atmosphere. Subsequently, the thus-fired product was heated at 800° C. in air, to thereby simultaneously form Ni external electrodes through baking and effect re-oxidation of the semiconducting ceramic material, thereby yielding a monolithic PTC thermistor 10 (specimen) as shown in FIG. 3. Four kinds of specimens were produced. A specimen of Comparative Example 2 was obtained through a conventional method in which the PTC characteristic was controlled on the basis of the amount x of added Mn and the amount y of added $SiO_2$. Specimens of Examples 4 to 6 were obtained through a method according to the invention in which the amounts of Mn and $SiO_2$ were limited to minimum levels and firing was performed at a relatively low temperature. The monolithic PTC thermistor 10 (specimen) shown in FIG. 3 includes a laminated body 12, in which semiconducting material layers 14 comprising the aforementioned semiconducting material and internal electrodes 16 made of Ni are alternately superposed one on another. Electrodes 16 superposed on alternate layers are disposed so as to extend to a first side face of the laminated body 12, and the remainder of electrodes 16 are disposed so as to extend to a second side face of the laminated body 12. An external electrode 18a is disposed on the first side face of the laminated body 12, and an external electrode 18b is disposed on the second side face of the laminated body 12. Thus, the external electrode 18a is connected to the electrodes 16 superposed on alternate layers, and the external electrode 18b is connected to the remainder of the electrodes 16.

Table 2 shows properties of the specimens in terms of the amount X of added Mn, the amount Y of added $SiO_2$, firing temperature, TN temperature, the difference between TN

TABLE 1

|  | Amount (X) of added Mn | Amount (Y) of added $SiO_2$ | Firing temperature (° C.) | TN temperature (° C.) | Difference between TN temperature and Curie temperature | Resistance at room temperature (Ω) | PTC characteristic $R_{max}/R_{25}$ (the number of digits) | Withstand voltage (V/mm) |
|---|---|---|---|---|---|---|---|---|
| Example 1 | 0 | 0.0005 | 1225 | 370 | 250 | 0.1 | 6 | 1200 |
| Example 2 | 0.00005 | 0.0005 | 1250 | 340 | 220 | 0.1 | 6 | 1100 |
| Example 3 | 0.0001 | 0.0005 | 1275 | 300 | 180 | 0.1 | 6 | 900 |
| Comparative Example 1 | 0.0005 | 0.01 | 1350 | 260 | 140 | 0.1 | 6 | 350 |

As is clear from Table 1 and FIG. 2, the withstand voltage of the specimens of Examples 1 to 3 can be considerably elevated by limiting the amounts of Mn and $SiO_2$ to minitemperature and Curie temperature, resistance at room temperature, the PTC characteristic ($R_{max}/R_{25}$) and withstand voltage.

TABLE 2

|  | Amount (X) of added Mn | Amount (Y) of added SiO$_2$ | Firing temperature (° C.) | TN temperature (° C.) | Difference between TN temperature and Curie temperature | Resistance at room temperature (Ω) | PTC characteristic R$_{max}$/R$_{25}$ (the number of digits) | Withstand voltage (V/mm) |
|---|---|---|---|---|---|---|---|---|
| Example 4 | 0 | 0.0003 | 1200 | 370 | 250 | 0.1 | 3.2 | 450 |
| Example 5 | 0.00004 | 0.0003 | 1225 | 340 | 220 | 0.1 | 3.1 | 420 |
| Example 6 | 0.00007 | 0.0003 | 1250 | 300 | 180 | 0.1 | 3.0 | 350 |
| Comparative Example 2 | 0.0005 | 0.01 | 1300 | 260 | 140 | 0.1 | 1.5 | 53 |

As is clear from Table 2, the withstand voltages of the specimens of Examples 4 to 6 can be elevated considerably by limiting the amounts of Mn and SiO$_2$ to minimum levels and firing at low temperature, although the specimens have resistance at room temperature and PTC characteristics similar to those of the specimen of Comparative Example 2.

As described hereinabove, the present invention can provide a PTC semiconducting BaTiO$_3$ ceramic material having a high withstand voltage and an electronic apparatus, such as a PTC thermistor, employing the ceramic material.

What is claimed is:

1. A semiconducting ceramic material comprising ATiO$_3$ in which A is Ba or Ba and Sm and which exhibits a positive temperature coefficient of resistance, wherein a boundary temperature defined at the boundary between a first temperature range and a second temperature range is at least 180° C. higher than the Curie temperature of the material, wherein the first temperature range is higher than the Curie temperature and the ceramic material has a positive temperature coefficient of resistance in the first range, and the second temperature range is higher than the first temperature range and the ceramic material has a negative temperature coefficient of resistance in the second range.

2. A semiconducting ceramic material according to claim 1, wherein A is Ba and Sm.

3. A semiconducting ceramic material according to claim 2, wherein said material contains SiO$_2$ and 0 to approximately 0.0001 mols of Mn per mol of ATiO$_3$.

4. A semiconducting ceramic material according to claim 3, wherein said the SiO$_2$ is in an amount of approximately 0.0005 mol per mol of ATiO$_2$.

5. A semiconducting ceramic material according to claim 1, wherein said material contains SiO$_2$ and 0 to approximately 0.0001 mols of Mn per mol of ATiO$_3$ 6. A semiconducting ceramic material according to claim 5, wherein said the SiO$_2$ is in an amount of approximately 0.0005 mol per mol of ATiO$_2$.

7. A semiconducting ceramic material according to claim 1, wherein the boundary temperature is at least about 220° C. higher than the Curie temperature.

8. A semiconducting ceramic material according to claim 1, wherein A is Ba.

9. An electronic part comprising a plurality of internal electrodes and a semiconducting ceramic material as recited in claim 1, the internal electrodes and the semiconducting ceramic material being alternately superposed one on another.

* * * * *